(12) United States Patent  
Herrmann et al.

(10) Patent No.: US 11,946,518 B2  
(45) Date of Patent: Apr. 2, 2024

(54) SLOTTED TORQUE PLATE BARREL

(71) Applicant: GOODRICH CORPORATION, Charlotte, NC (US)

(72) Inventors: Nathaniel J. Herrmann, Springfield, OH (US); Robert L. French, Beavercreek, OH (US); Phillip E. Cooley, Kettering, OH (US); Jacob Allen Dickel, New Vienna, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 105 days.

(21) Appl. No.: 17/719,171

(22) Filed: Apr. 12, 2022

(65) Prior Publication Data

US 2023/0323927 A1    Oct. 12, 2023

(51) Int. Cl.
| | |
|---|---|
| *F16D 65/095* | (2006.01) |
| *B64C 25/44* | (2006.01) |
| *F16D 55/36* | (2006.01) |
| *F16D 65/847* | (2006.01) |
| *F16D 55/00* | (2006.01) |
| *F16D 65/02* | (2006.01) |

(52) U.S. Cl.
CPC ............ *F16D 65/095* (2013.01); *B64C 25/44* (2013.01); *F16D 55/36* (2013.01); *F16D 65/847* (2013.01); *F16D 2055/0008* (2013.01); *F16D 2065/1364* (2013.01); *F16D 2250/00* (2013.01)

(58) Field of Classification Search
CPC .. F16D 55/36; F16D 2065/785; F16D 65/847; F16D 2065/1328; F16D 65/128; F16D 65/78; F16D 2069/006; F16D 2065/1332; F16D 65/853; F16D 65/807; F16D 65/827; F16D 65/095; F16D 2055/0008; F16D 2065/1364; F16D 2250/00; B64C 25/44

See application file for complete search history.

(56) References Cited

U.S. PATENT DOCUMENTS

| | | | |
|---|---|---|---|
| 4,102,438 A * | 7/1978 | Rancourt .............. | F16D 65/847 188/71.6 |
| 5,323,881 A * | 6/1994 | Machan .................. | F16D 55/36 188/18 A |
| 6,257,376 B1 * | 7/2001 | Borgeaud .............. | F16D 65/126 192/113.21 |

(Continued)

FOREIGN PATENT DOCUMENTS

| | | |
|---|---|---|
| CN | 215596254 | 1/2022 |
| GB | 669438 | 4/1952 |

OTHER PUBLICATIONS

CN 208578906 U (Year: 2019).*

(Continued)

*Primary Examiner* — Robert A. Siconolfi  
*Assistant Examiner* — Mahbubur Rashid  
(74) *Attorney, Agent, or Firm* — SNELL & WILMER L.L.P.

(57) ABSTRACT

A torque barrel for use with a brake system may comprise a torque barrel having a cylindrical structure including an inner surface, an outer surface, a first opening at a first end, and a second opening at an opposing second end; and a longitudinal hole disposed through the outer surface of the barrel between a first spline of the plurality of splines and a second spline of the plurality of splines.

18 Claims, 9 Drawing Sheets

(56) References Cited

U.S. PATENT DOCUMENTS

| | | | |
|---|---|---|---|
| 7,909,146 B2* | 3/2011 | Dyko | F16D 55/025 |
| | | | 188/71.5 |
| 9,759,278 B2 | 9/2017 | Rook | |
| 10,619,690 B2* | 4/2020 | Remond | F16D 65/847 |
| 11,118,620 B2* | 9/2021 | Whittle | B64C 25/42 |
| 2004/0206595 A1 | 10/2004 | Wakabayashi et al. | |

OTHER PUBLICATIONS

CN 215596254 U (Year: 2022).*
FR 3112755 A1 (Year: 2022).*
European Patent Office, European Search Report dated Aug. 21, 2023 in Application No. 23166740.3.

* cited by examiner

SLOTTED TORQUE PLATE BARREL

FIELD

The present disclosure generally relates to aircraft wheel and brake systems and, more particularly, to torque plates and barrels for brake assemblies.

BACKGROUND

Aircraft typically utilize brake systems on wheels to slow or stop the aircraft during landings, taxiing, and rejected takeoffs. The brake systems generally employ a brake stack comprising a series of friction disks that may be forced into sliding contact with one another during brake actuation to slow or stop the aircraft. A torque plate and barrel is employed to support the series of friction disks.

SUMMARY

A torque barrel for a brake system is disclosed herein. The torque barrel may include a torque barrel having a cylindrical structure including an inner surface, an outer surface, a first opening at a first end, and a second opening at an opposing second end; and a longitudinal hole disposed through the outer surface of the barrel between a first spline of the plurality of splines and a second spline of the plurality of splines.

In various embodiments, the longitudinal hole has a first end having a tear drop shape.

In various embodiments, the first end has a length and a width, the length to width ratio being about 1.5:1.

In various embodiments, the longitudinal hole has a width in a circumferential direction and a length in an axial direction and the width of the longitudinal hole at a first end is greater than the width at the second end.

In various embodiments, the one or more longitudinal holes have a first end, an opposing second end, and a center portion, the center portion having a first width and the first end having a second width that is greater than the first width.

In various embodiments, the torque barrel may further include a second longitudinal hole disposed between the longitudinal hole and the first end of the barrel.

In various embodiments, the second longitudinal hole is axially in line with and aft of the longitudinal hole.

In various embodiments, the longitudinal hole has a first length and the second longitudinal hole has a second length that is less than the first length.

In various embodiments, the torque barrel may further include a plurality of longitudinal holes disposed through the outer surface of the torque barrel, the plurality of longitudinal holes being disposed symmetrically.

In various embodiments, the torque barrel may further include a plurality of splines disposed around a circumference of the barrel and extending from the first end to the second end along the outer surface of the barrel.

In various embodiments, the torque barrel may further include a torque plate coupled to the second end of the barrel, the torque plate including a plurality of back legs, each back leg of the plurality of back legs having a hole disposed therein.

A brake assembly attached to a wheel is disclosed herein. The brake assembly may include a torque barrel having an outer surface and an axial length; an elongated hole disposed in the outer surface along the axial length, the elongated hole having a rounded first end and an opposing rounded second end; a heat sink disposed around the torque tube; and a plurality of stator disks mounted to the torque barrel.

In various embodiments, the rounded first end has a length and a width, the length being greater than the width.

In various embodiments, the elongated hole has a center portion extending between the first end and the second end, the center portion having a second width that is less than the width.

In various embodiments, the elongated hole is a first elongated hole, and the brake assembly may further include a second elongated hole disposed in the outer surface of the torque tube, the second elongated hole being disposed along the axial length of the torque tube and circumferentially adjacent the first elongated hole.

In various embodiments, the second elongated hole is longer than the first elongated hole.

In various embodiments, the brake assembly may further include a spline disposed along the outer surface of the torque tube adjacent the elongated hole.

In various embodiments, the elongated hole is a first elongated hole and the brake assembly further include a second elongated hole disposed axially in line with the first elongated hole.

In various embodiments, the elongated hole is a first elongated hole and the brake assembly may further include a second elongated hole disposed in the outer surface of the torque tube, the second elongated hole having a first end and a second end, the first end of the second elongated being axially offset from the first elongated hole.

A method of forming a torque barrel is disclosed herein. The method may include forming a barrel having an outer surface having a first end and an opposing second end; and forming an elongated hole in the outer surface of the barrel, the elongated hole having a first end, an opposing second end, and a center portion, the elongated hole extending between the first end and the second end.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
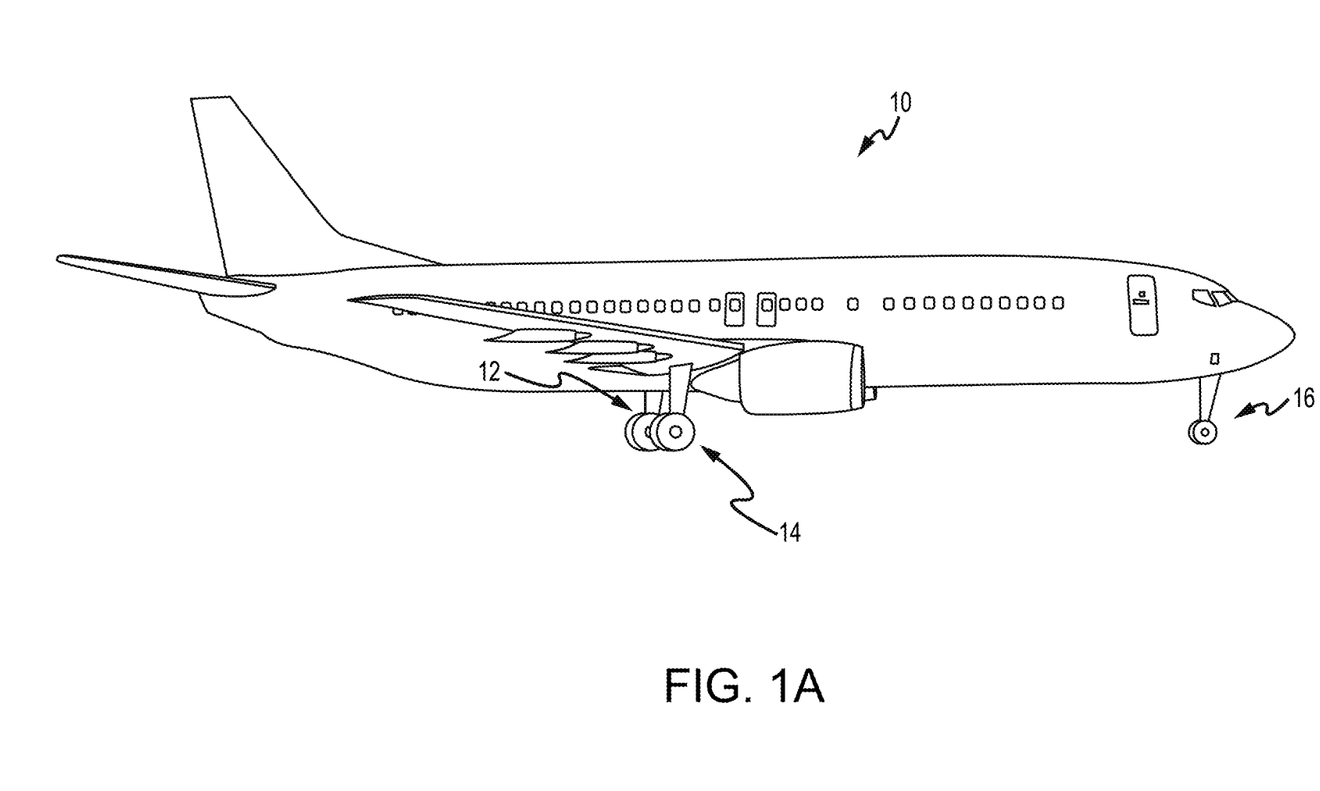
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
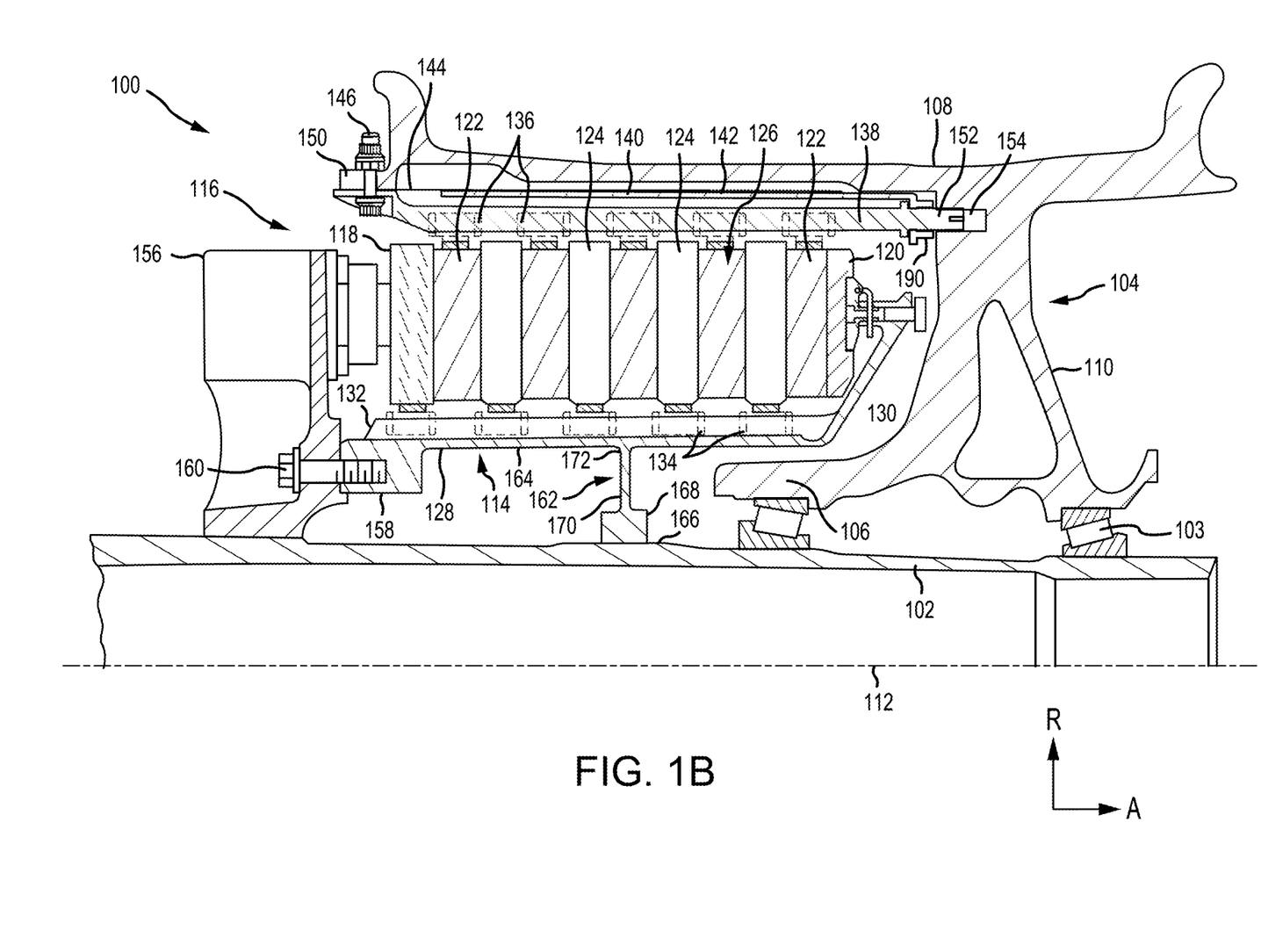
FIG. 1B illustrates a cross-sectional view of a brake assembly, in accordance with various embodiments.

Referring now to FIG. 1B, there is schematically depicted a brake mechanism 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Each brake assembly, including the torque plate barrel 114, is designed for a specific application and modes of operation. The size (e.g., length, diameter, thickness, etc.) and material of the torque plate barrel 114 may be modified to suit a particular application or improve a mode of operation. Different modes of operation that are considered include whirl, squeal, and disc squeal, just to name a few. Additional design considerations include dynamic stability, such as torsional compliance, axial compliance, and structural asymmetry, and cooling of the brake assembly, including the torque plate barrel 114.

Figure 2A:
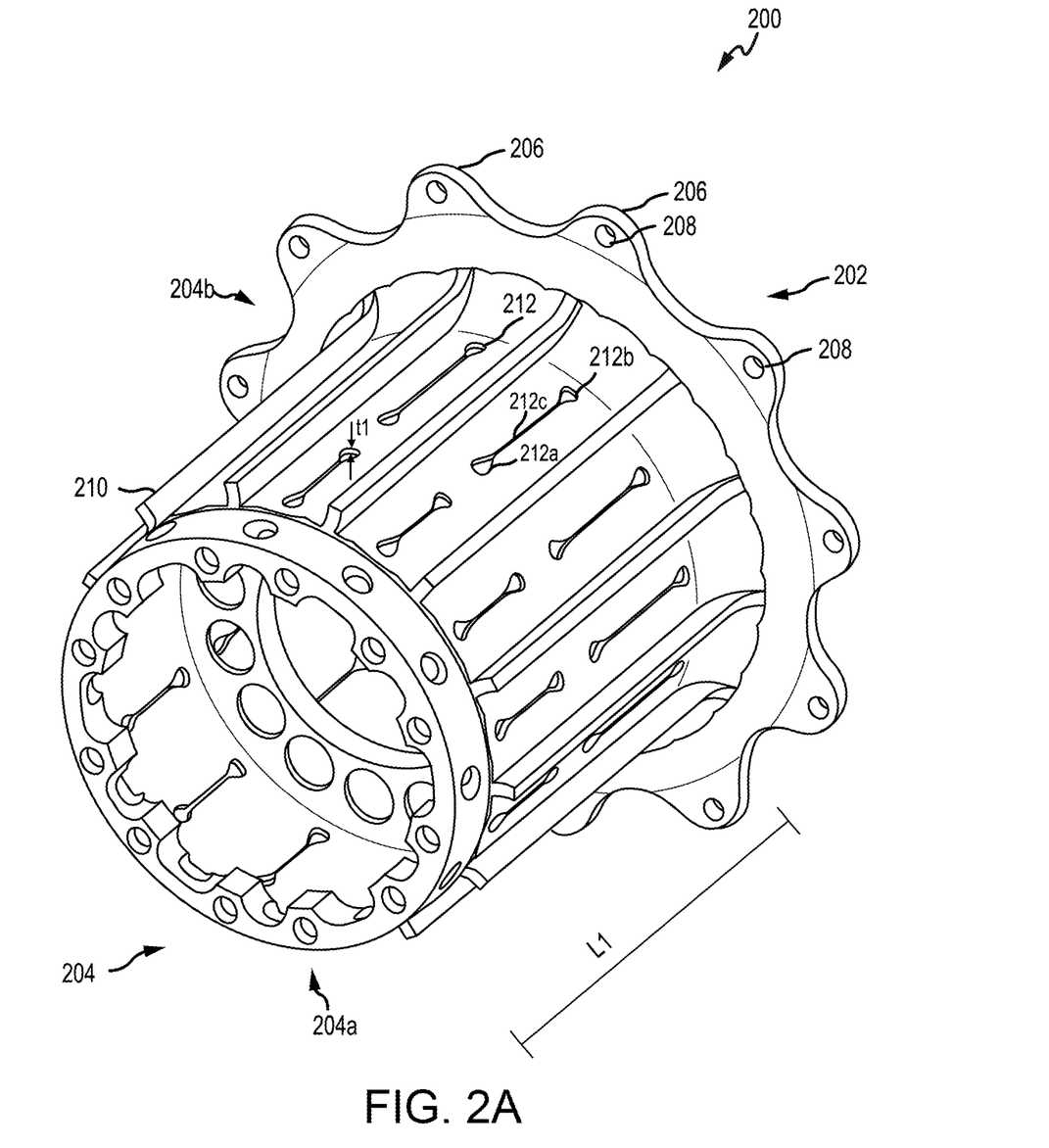
FIGS. 2A-2C illustrates perspective views of a torque plate and barrel, in accordance with various embodiments.
Figure 2B:
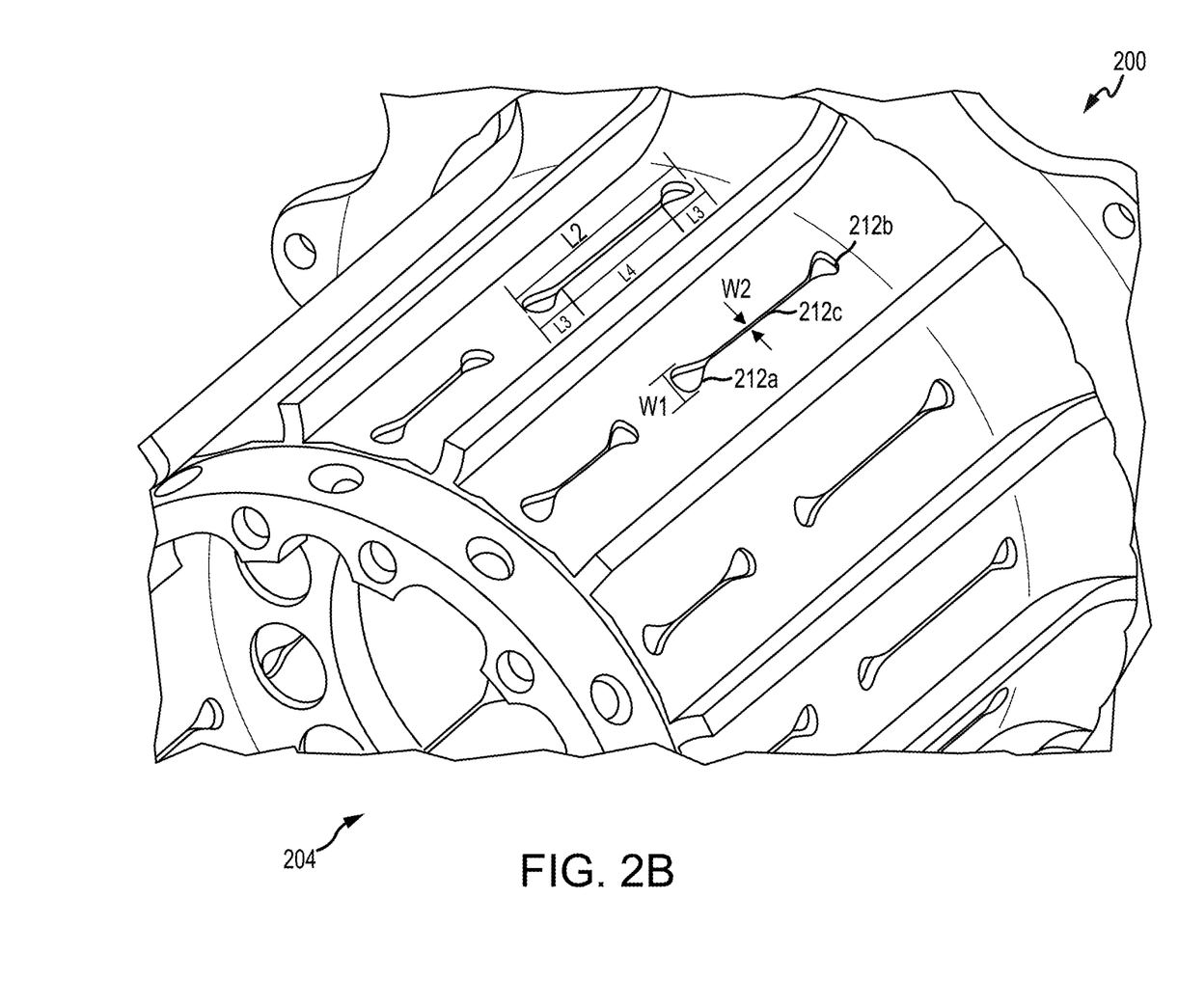
Figure 2C:
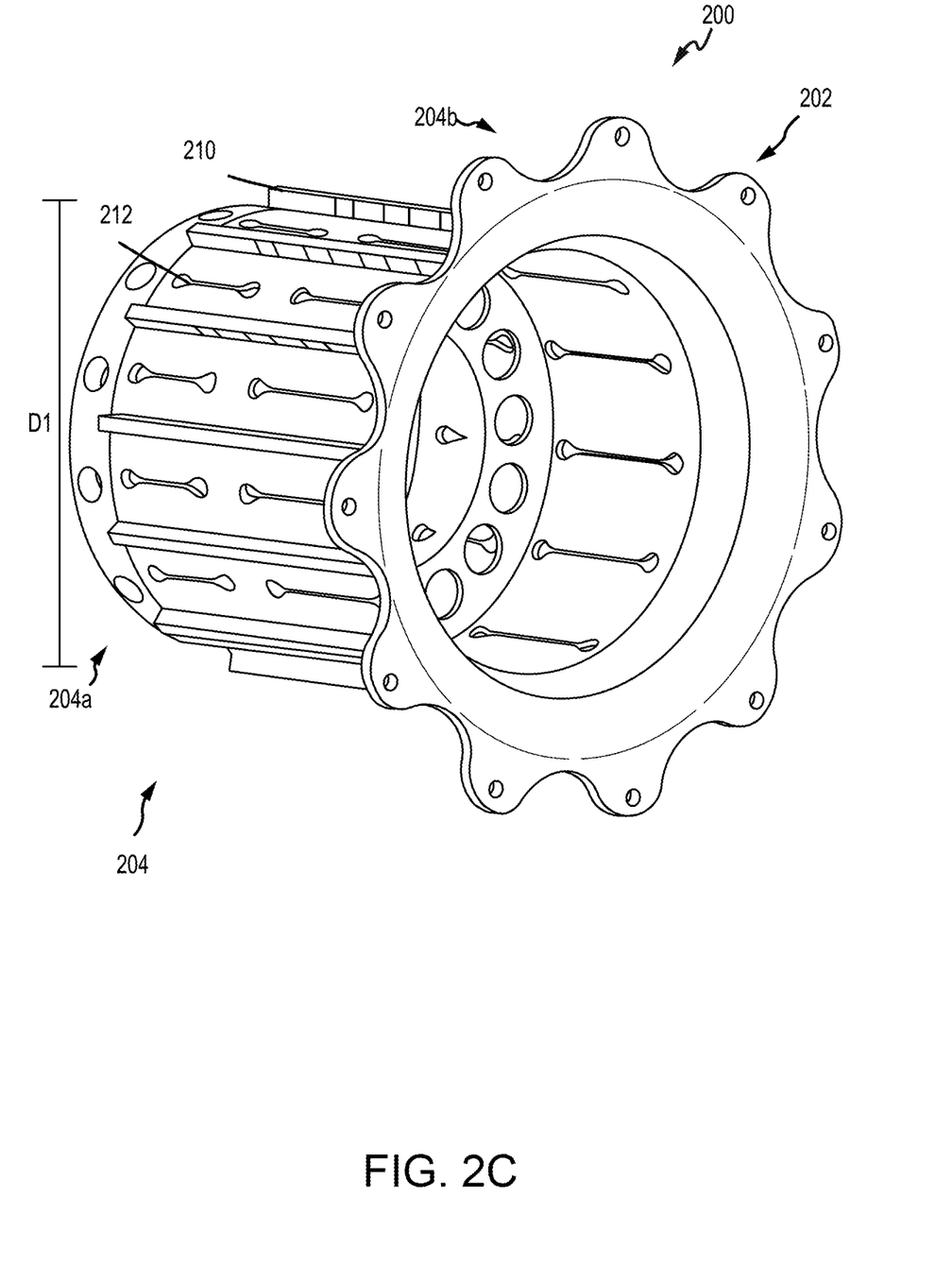

Referring now to FIGS. 2A-2C, there is depicted perspective views of an exemplary torque plate barrel 200. The torque plate barrel 200 may be an example of the torque plate barrel 114 described above. The torque plate barrel 200 includes a torque plate 202 and a torque barrel 204. The torque barrel 204 has a cylindrical, or tubular, structure having an opening at a first end 204a with an opening at an opposing second end 204b. The second end 204b of the torque barrel 204 is coupled to the torque plate 202. In the depicted embodiment, the torque plate barrel 200, the torque plate 202 and the torque barrel 204, may be formed as single unit. In various embodiments, the torque plate barrel 200 may be formed from separate pieces where the torque barrel 204 and the torque plate 202 are coupled through other means such as welding, riveting, etc. FIG. 2A depicts a perspective view of the torque plate barrel 200 from the first end 204a of the torque barrel 204. FIG. 2B depicts an enlarged perspective view of the torque barrel 204 from the first end 204a of the torque barrel 204. FIG. 2C depicts a perspective view of the torque plate barrel 200 from the second end 204b of the torque barrel 204.

The torque plate 202 includes back legs 206 that are circumferentially disposed around the outer edge of the torque plate 202. Each back leg 206 has a hole 208 disposed therein for mounting the torque plate barrel 200, specifically the torque plate 202, to a brake assembly. Each back leg 206 may be uniformly spaced around the circumference of the torque plate 202 to provide uniform support when mounting to the brake assembly.

The torque barrel 204 extends from the torque plate 202 at the second end 204b. The torque barrel has a first length L1 that extends axially from the first end 204a to the second end 204b of the torque barrel 204. Additionally, the torque barrel 204 has a diameter D1 and a thickness t1.

One or more splines 210 are circumferentially disposed around the exterior of the torque barrel 204. The one or more splines 210 may be uniformly spaced around the circumference of the torque barrel 204. In some embodiments, each spline 210 may have a length that is equal to the length L1 of the torque barrel 204. In the depicted embodiment, each spline 210 has a length that is less than the length L1 of the torque barrel 204.

One or more engineered slots 212 are formed in, and extending through, the surface the torque barrel 204 in strategic locations to achieve dynamic stability and convective cooling of the heatsink. The slots 212 may alternatively be referred to as elongated holes or longitudinal holes. The slots 212 extend through the thickness t1 of the torque barrel 204. The shape, size, space, and location can be tailored to shift a particular problematic frequency to a more benign frequency and/or achieve tailored convective cooling or thermal balance. The slots 212 allow increased air flow around and through the torque barrel 204 which accelerates the cooling of the heat sink disposed around the outer diameter of the torque barrel 204. In various embodiments, thermal modeling showed a decrease in operating temperatures of the brake mechanism during peak operation when using the torque plate barrel 200 with the slots 212 as compared a torque plate barrel without slots 212. For example, thermal modeling of the brake mechanism 100 showed a decrease of 7° F. at the axle flange, 3° F. at the piston housing 156, and 1° F. at the hub 106 among other components, when using the torque plate barrel 200 with the slots 212 as compared to using a torque plate barrel without slots 212.

While the slots 212 may increase stress and/or stress concentration, the increases are not significant and can be mitigated through design changes. In some cases, introducing slots 212 improves dynamic stability which may allow for weight reduction and part count reduction. The slots 212 further decrease axial heat flow into the piston housing 156 and the axel flange and increase the cooling rate of the heatsink.

Each slot 212 has a length L2, a first end 212a, a second end 212b, and a center portion 212c extending from the first end 212a to the second end 212b. The length L2 of slot 212 is less than the length L1 of the torque barrel 204. In some embodiments, a single slot 212 may be formed extending in an axial direction between the first end 204a and the second end 204b of the torque barrel 204. In the depicted embodiment, two slots 212 are formed with the first slot 212 being axially in line with the second slot 212 and the slots 212 being circumferentially centered between a pair of splines 210. Additionally, the first slot 212 is depicted as having a length L2 that is greater than the length L2 of the second slot 212. The first and second ends 212a, 212b have a length L3 in the axial direction of the torque barrel 204 and a width W1 in the circumferential direction of the torque barrel 204. In the depicted embodiment, the length L3 and width W1 of the ends 212a, 212b are equal to one another. In some other embodiments, the length L3 and/or W1 of the first end 212a may be different length L3 and/or the width W1 of the second end 212b. The center portion 212c has a length L4 and a width W2 which may be increased or decreased to suit a particular need. As depicted, the slots 212 are symmetrically disposed around the outer circumference of the torque barrel 204. In various embodiments, when the width W2 is increased the thickness t1 of the torque barrel may be increased by up to about 0.01 inches.

Each of the lengths L2, L3, L4 and widths W1, W2 are adjustable to achieve a desired shape and characteristics of the slots 212. For example, ends 212a, 212b may be round or rounded, square, hexagonal, tear drop, just to name a few. As another example, the center portion 212c may be longer or shorter and/or wider than depicted. Different slot end shapes and distance between slot ends provide different characteristics of the torque barrel 204. For example, as depicted in FIGS. 2A-2C, ends 212a, 212b are a tear drop shape where the outer portion of the tear drop shape is semi-circular in shape with the inner portion (i.e., toward the center portion 212) is elongated and comes to a point such that the length L3 is greater than the width W1. In various embodiments, the length L3 to width W1 ratio may be about 1:1 to about 2:1. In various embodiments, the length L3 to width W1 ratio may be about 1.2:1 to about 1.8:1. In various embodiments, the length L3 to width W1 ration may be about 1.4:1 to about 1.6:1. The tear drop shape reduces stresses in the torque barrel 204 that are introduced by the slots 212.

For example, in various embodiments, maximum torsional deflection of torque plate barrel 200 at peak torque increased from −0.0032975 inches without slots 212 to −0.010398 inches with slots 212 while axial deflection of torque plate barrel 200 only increased from 0.038256 inches without slots 212 to 0.039935 inches with slots 212. That is, the torsion compliance at peak torque increases the torsional compliance by a factor of 3.2 while the axial compliance at maximum operational pressure increased by only 4.4%. Similarly, analysis of various embodiments saw no appreciable change to the strength of torque plate barrel 200 with respect to proof pressure, burst pressure, peak torque, and structural torque. For example, the proof pressure stresses increased slightly from 141.7 kilo pound-per-square-inch (KSI) without slots 212 to 144.7 KSI with slots 212. Burst pressure stresses decreased slightly from 145.5 KSI without slots 212 to 144.5 KSI with slots 212. Peak torque stresses pressure increased slightly from 149.5 KSI without slots 212 to 154.5 KSI with slots 212. Structural torque pressure stresses increased slightly from 154.4 KSI without slots 212 to 158.7 KSI with slots 212.

Figure 3:
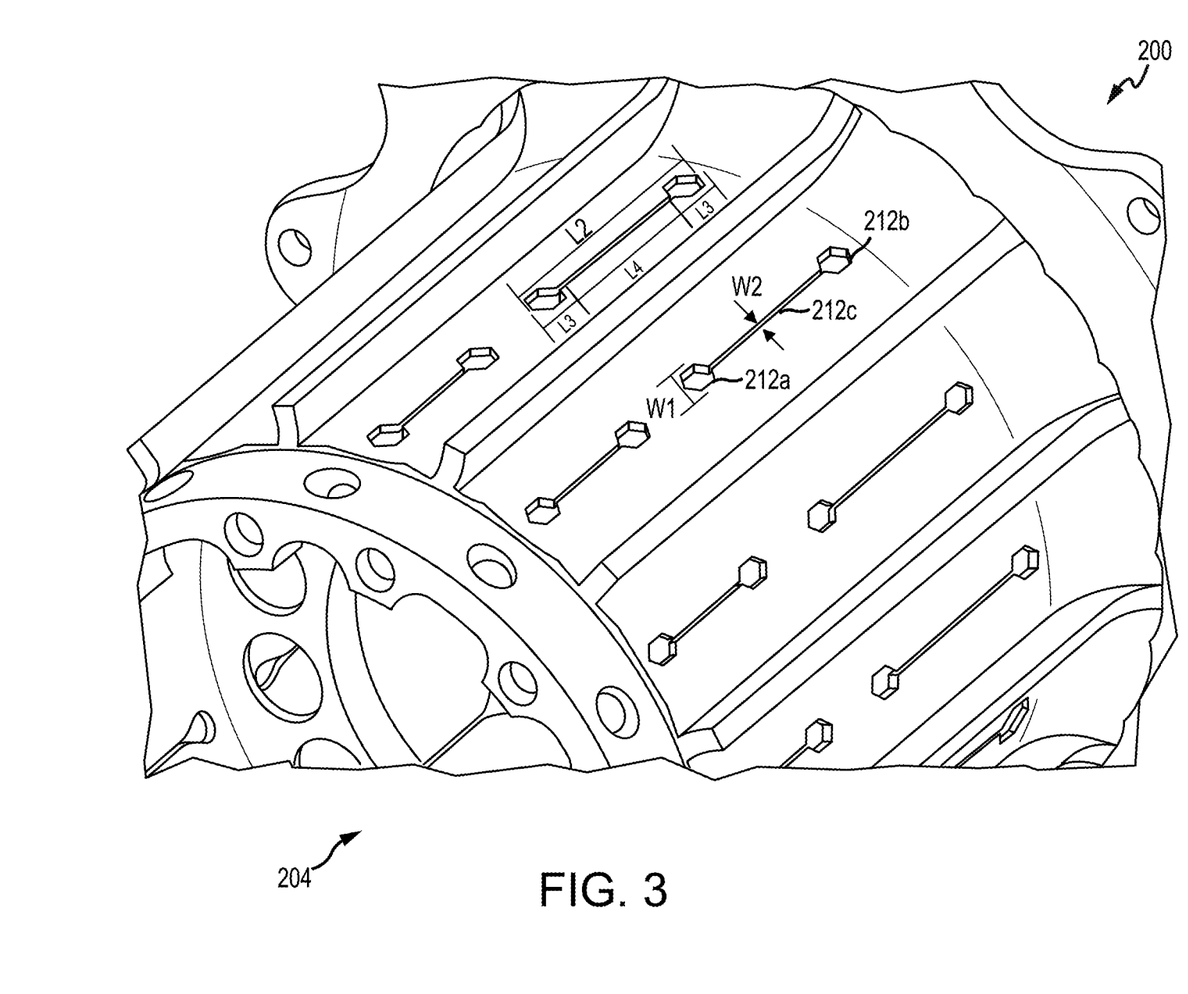
FIGS. 3-4 illustrate perspective views of a torque plate and barrel having slots with various geometries, in accordance with various embodiments.
Figure 4:
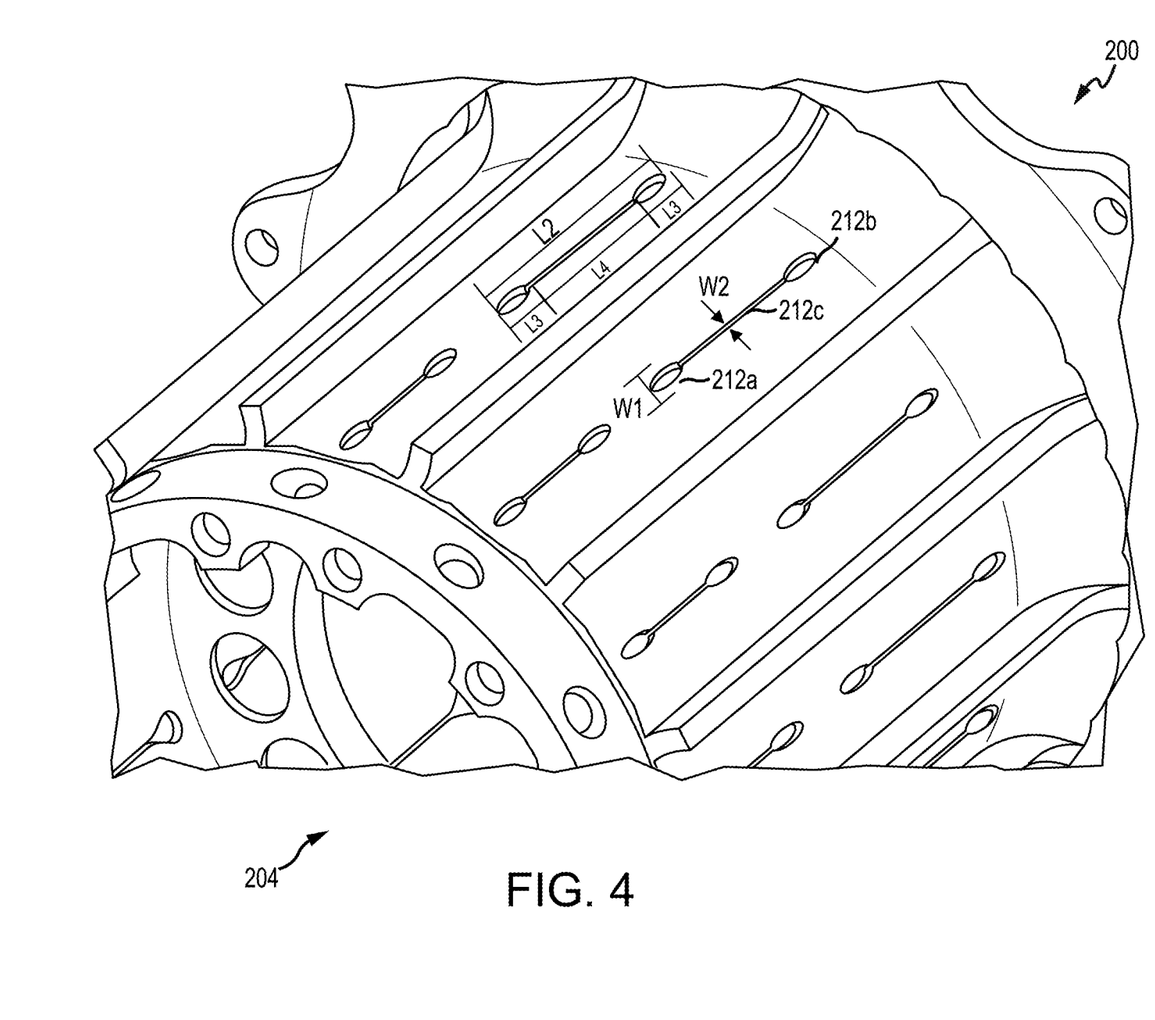

In various embodiments, ends 212a, 212b of slots 212 may have a hexagonal shape such as depicted in FIG. 3. The hexagonal shape may have six edges and five vertices. Four of the edges may be equal length with the other two edges connecting to the center portion 212c, thereby being shorter than the four edges. The connection to center portion 212c further removes one of the vertices resulting in the five vertices of the hexagonal shaped ends 212a, 212b.

Figure 5:
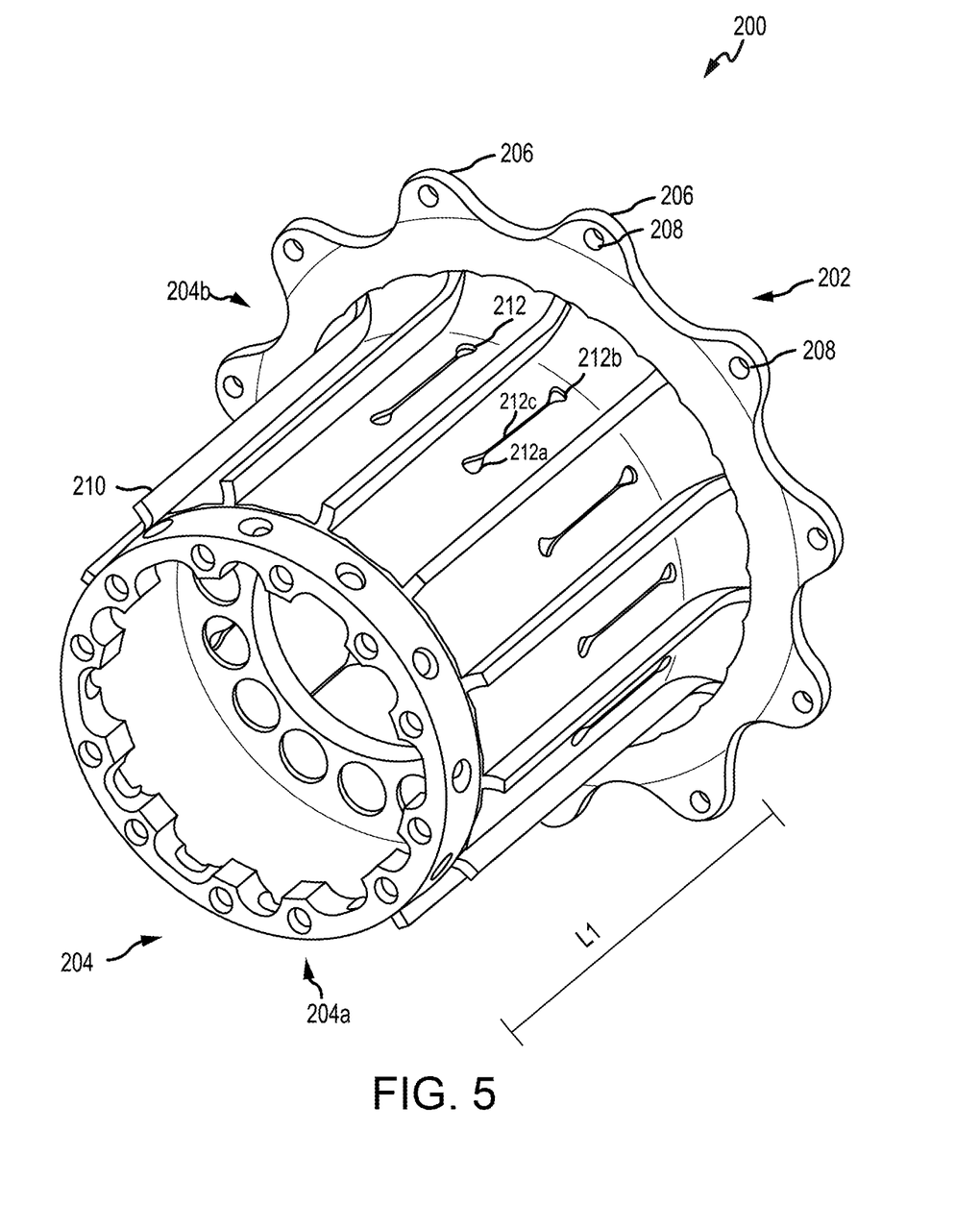
FIGS. 5-6 illustrate perspective views of a torque plate and barrel having slots with various positions, in accordance with various embodiments.

Spacing of the slots 212 around the exterior of the torque barrel 204 may be modified to improve characteristics and modes of the brake assembly. That is, slots 212 may be added or removed and/or shifted in both the axial direction and the circumferential direction with respect to the torque barrel 204. For example, in various embodiments, there may be four slots 212 that formed in the torque barrel 204 with each slot being circumferentially offset 90° from each of the other slots 212. In various embodiments, slots 212 may be formed around one half circumferentially of the torque barrel 204 but not around the other half, an asymmetrical distribution. In various embodiments, slots 212 may be formed around one half axially of the torque barrel 204 but not around the other half, as depicted in FIG. 5, a symmetrical distribution.

Figure 6:
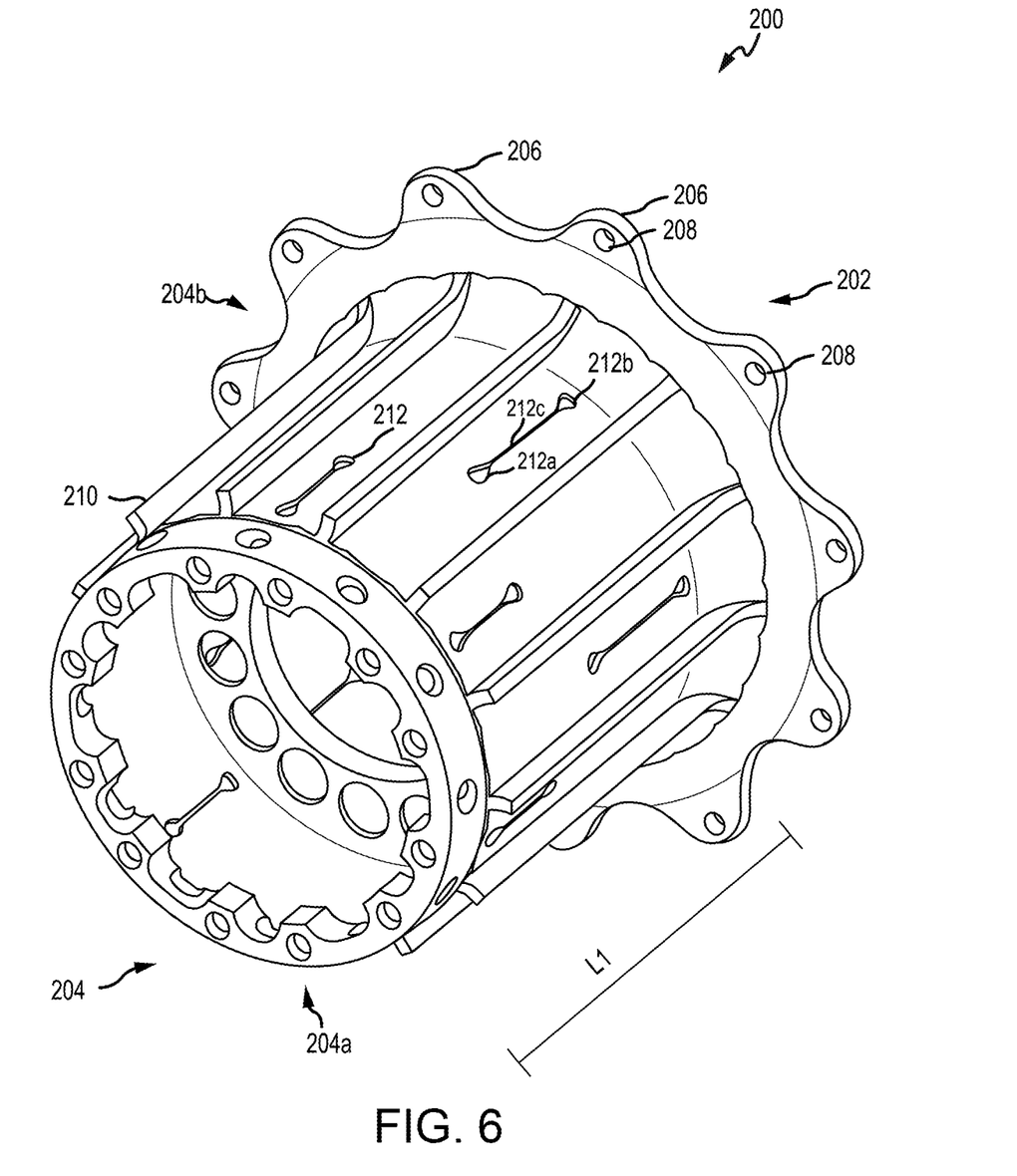

Location of the slots 212 may also be modified to improve characteristics and modes of the brake assembly. For example, in various embodiments, the slots 212 may alternate positions along the axial length, length L1, of the torque barrel 204 as they are formed around the circumference of the torque barrels. For example, as depicted in FIG. 6, a first slot 212 may have a length L2 that is half of L1 and be positioned with the second end 212b closer to the second end 204b than the first end 212a is to the first end 204a. A second slot 212 may then have a length L2 that is half of L1 and be positioned with the first end 212a closer to the first end 204a than the second end 212b is to the second end 204b. In other words, the first slot 212 is axially offset from the second slot 212. Slots 212 may be formed around exterior of the torque barrel 204 in this manner. Other combinations of spacing are possible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A torque barrel for use with a brake system, comprising:
a torque barrel body having a cylindrical structure including an inner surface, an outer surface, a first opening at a first end, and a second opening at an opposing second end; and
a longitudinal hole disposed through the outer surface of the torque barrel body between a first spline of a plurality of splines and a second spline of the plurality of splines, wherein the longitudinal hole has a first end, an opposing second end, and a center portion, the center portion having a first width and the first end having a second width that is greater than the first width.

2. The torque barrel of claim 1, wherein the longitudinal hole has a first end having a tear drop shape.

3. The torque barrel of claim 2, wherein the first end has a length and a width, the length to width ratio being about 1.5:1.

4. The torque barrel of claim 1, wherein the longitudinal hole has a width in a circumferential direction and a length in an axial direction and the width of the longitudinal hole at a first end is greater than the width at the second end.

5. The torque barrel of claim 1, further comprising:
a second longitudinal hole disposed between the longitudinal hole and the first end of the torque barrel body.

6. The torque barrel of claim 5, wherein the second longitudinal hole is axially in line with and aft of the longitudinal hole.

7. The torque barrel of claim 6, wherein the longitudinal hole has a first length and the second longitudinal hole has a second length that is less than the first length.

8. The torque barrel of claim 1, further comprising:
a plurality of longitudinal holes disposed through the outer surface of the torque barrel body, the plurality of longitudinal holes being disposed symmetrically around an outer circumference of the torque barrel body.

9. The torque barrel of claim 1, wherein the plurality of splines is disposed around a circumference of the torque barrel body and each spline of the plurality of splines extends from the first end to the second end along the outer surface of the torque barrel body.

10. The torque barrel of claim 1, further comprising:
a torque plate coupled to the second end of the torque barrel body, the torque plate including a plurality of back legs, each back leg of the plurality of back legs having a hole disposed therein.

11. A brake assembly attached to a wheel, comprising:
a torque barrel having an outer surface and an axial length;
an elongated hole disposed in the outer surface along the axial length, the elongated hole having a rounded first end having a first width and an opposing rounded second end, wherein the elongated hole has a center portion extending between the first end and the second end, the center portion having a second width that is less than the first width;
a heat sink disposed around the torque barrel; and
a plurality of stator disks mounted to the torque barrel.

12. The brake assembly of claim 11, wherein the rounded first end has a length that is greater than the first width.

13. The brake assembly of claim 11, wherein the elongated hole is a first elongated hole, the brake assembly further comprising:
a second elongated hole disposed in the outer surface of the torque barrel, the second elongated hole being disposed along the axial length of the torque barrel and circumferentially adjacent the first elongated hole.

14. The brake assembly of claim 13, wherein the second elongated hole is longer than the first elongated hole.

15. The brake assembly of claim 11, further comprising:
a spline disposed along the outer surface of the torque barrel adjacent the elongated hole.

16. The brake assembly of claim 11, wherein the elongated hole is a first elongated hole, the brake assembly further comprising:
a second elongated hole disposed axially in line with the first elongated hole.

17. The brake assembly of claim 11, wherein the elongated hole is a first elongated hole, the brake assembly further comprising:
a second elongated hole disposed in the outer surface of the torque barrel, the second elongated hole having a first end and a second end, the first end of the second elongated being axially offset from the first elongated hole.

18. A method of forming a torque barrel, comprising:
forming a barrel having an outer surface having a first end and an opposing second end; and
forming an elongated hole in the outer surface of the barrel, the elongated hole having a first end, an opposing second end, and a center portion, the elongated hole extending between the first end and the second end, the center portion having a first width and the first end having a second width that is greater than the first width.

* * * * *